US009253122B1

(12) United States Patent
Zhang et al.

(10) Patent No.: US 9,253,122 B1
(45) Date of Patent: Feb. 2, 2016

(54) PREAMBLE FOR COMMUNICATION IN POWER LINE CHANNEL

(71) Applicant: MARVELL INTERNATIONAL LTD., Hamilton (BM)

(72) Inventors: Jin Zhang, Newark, CA (US); Kok-Wui Cheong, Mountain View, CA (US)

(73) Assignee: MARVELL INTERNATIONAL LTD. (BM)

( * ) Notice: Subject to any disclaimer, the term of this patent is extended or adjusted under 35 U.S.C. 154(b) by 378 days.

(21) Appl. No.: 13/686,039

(22) Filed: Nov. 27, 2012

Related U.S. Application Data

(60) Provisional application No. 61/565,892, filed on Dec. 1, 2011.

(51) Int. Cl.
*H04L 12/931* (2013.01)

(52) U.S. Cl.
CPC .................... *H04L 49/405* (2013.01)

(58) Field of Classification Search
CPC ...... H04B 3/54; H04B 3/542; H05B 37/0263; H04L 49/405
USPC ................. 340/12.32, 13.23; 370/389, 392
See application file for complete search history.

(56) References Cited

U.S. PATENT DOCUMENTS

| 2004/0160990 | A1* | 8/2004 | Logvinov et al. | 370/509 |
|---|---|---|---|---|
| 2006/0077046 | A1* | 4/2006 | Endo | 340/310.11 |
| 2009/0299532 | A1* | 12/2009 | Zyren | 700/276 |
| 2011/0014910 | A1* | 1/2011 | Yonge et al. | 455/434 |
| 2011/0043340 | A1* | 2/2011 | Kim et al. | 340/310.12 |
| 2011/0222595 | A1* | 9/2011 | Choi et al. | 375/238 |
| 2011/0243157 | A1* | 10/2011 | Oishi et al. | 370/498 |
| 2012/0093198 | A1* | 4/2012 | Dabak et al. | 375/139 |
| 2014/0105313 | A1* | 4/2014 | Kim et al. | 375/257 |

* cited by examiner

*Primary Examiner* — Paul H Masur
*Assistant Examiner* — Kabir Jahangir

(57) ABSTRACT

Systems, methods, and other embodiments associated with using a preamble with at least two polarity transitions to communicate over a power line channel are described. According to one embodiment, an apparatus includes a transmitter configured to transmit a communication signal on a communication channel for communicating with a remote device. The communication channel is a power line channel that carries electric power transmissions. The apparatus also includes a transmission logic configured to control the transmitter to generate at least two polarity transitions in a preamble of the communication signal.

17 Claims, 7 Drawing Sheets

PREAMBLE FOR COMMUNICATION IN POWER LINE CHANNEL

CROSS REFERENCE TO RELATED APPLICATIONS

This patent disclosure claims the benefit of U.S. Provisional Application No. 61/565,892 filed on Dec. 1, 2011, which is incorporated herein by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Narrow-band low-rate communications have wide application. For example, narrow-band low-rate communications can be used with a power line channel to provide communications using existing power delivery infrastructure (e.g., home electrical lines). While using existing power delivery infrastructure for communications simplifies certain aspects of a communication system, other difficulties arise when using a power line channel for communications. For example, a power line channel can include impulsive noise, which often interferes with portions of a communication used to detect packet boundaries. Thus, using narrow band low-rate communications over a power line channel can result in decreased data throughput due to a decreased ability for a receiving device to detect packets.

SUMMARY

In general, in one aspect this specification discloses an apparatus. The apparatus includes a transmitter configured to transmit a communication signal on a communication channel for communicating with a remote device. The communication channel is a power line channel that carries electric power transmissions. The apparatus also includes a transmission logic configured to control the transmitter to generate at least two polarity transitions in a preamble of the communication signal.

In general, in another aspect, this specification discloses a method. The method includes controlling a transmitter to generate at least two polarity transitions in a preamble of a communication signal. The method includes transmitting, by the transmitter, the communication signal on a communication channel for communicating with a remote device. The communication channel is a power line channel that carries electric power transmissions.

In general, in another aspect, this specification discloses an apparatus. The apparatus includes a receiver configured to receive a communication from a communication channel that is a power line channel. The apparatus includes a decoder logic configured to determine a boundary in the communication between a preamble and a header. The decoder logic is configured to determine the boundary based, at least in part, on one of at least two polarity transitions in the preamble.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa.

DETAILED DESCRIPTION

Described herein are examples of systems, methods, and other embodiments associated with using a preamble to communicate over a power line channel, in which the preamble includes at least two polarity transitions. Typically, when a first device transmits a communication over a power line channel to a second device, the communication includes a preamble, a header, and a payload. The preamble is the first portion of the communication that is followed by the header and the payload. The second device uses the preamble to determine where substantive portions (e.g., the header and the payload) of the communication begin. For example, the preamble can include a change in polarity between symbols (e.g., a first symbol having a positive polarity followed by a second symbol having a negative polarity or vice versa) that indicates to the second device that the header begins after, for example, one more data symbol. In this way, the first device can indicate to the second device where information in the communication is located.

However, because of noise on the power line channel (i.e., the communication channel), sometimes the polarity transition can become corrupted such as when the polarity transition coincides with an impulsive noise burst. The impulsive noise burst is a type of noise that occurs in a sudden step-like transition on a power line carrier and then quickly dissipates. The power line carrier is a wire that carries power/electricity. The power line carrier also carries communications via the power line channel embodied within the power line carrier. For example, the impulsive noise burst can be a sudden spike in voltage on the power line channel that causes a voltage on the power line channel to jump from, for example, 0 volts to 110 volts. Accordingly, when the preamble includes a single polarity transition that is corrupted by noise, the entire communication is likely to be lost. Thus, in one embodiment, a first device generates a preamble with at least two polarity transitions. By including at least two polarity transitions in the preamble, the first device ensures that a second device will detect at least one of the two polarity transitions if noise on the power line channel interferes with the preamble.

Figure 1:
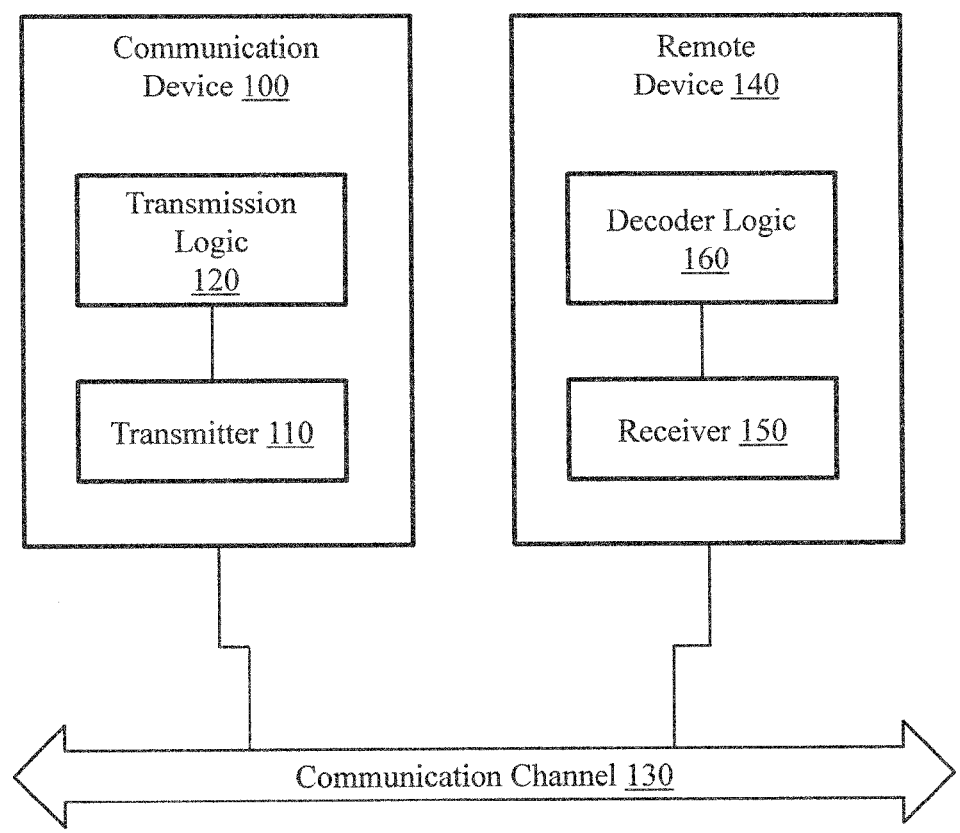
FIG. 1 illustrates one embodiment of a communication device associated with communicating over a power line channel.

FIG. 1 illustrates one embodiment of a communication device 100 associated with communicating over a power line channel. The communication device 100 includes a transmitter 110 and transmission logic 120. The communication device 100 is connected to a communication channel 130. The transmitter 110 is configured to transmit communications on the communication channel 130 to communicate with, for example, a remote device 140. The transmission logic 120 controls the transmitter 110 to generate communications that are sent to the remote device 140. When generating the communications (e.g., packets), the transmission logic 120 controls the transmitter 110 to generate at least two polarity transitions in a preamble of the communication prior to transmission to the remote device 140. In this way, if noise (e.g., impulsive noise) corrupts one of the two polarity transitions, then the other polarity transition will likely remain uncorrupted. This allows the remote device 140 to detect at least one of the two polarity transitions to determine information about the packet. In one embodiment, the polarity transitions are configured to identify a boundary between the preamble and a header of the packet. In one embodiment, the two polarity transmissions provide duplicate information in different polarities, but other polarity transmissions can be configured to represent different information.

In one embodiment, the remote device 140 includes a receiver 150 for receiving communications from one or more devices (e.g., the communication device 100) and a decoder logic 160. The decoder logic 160 is configured to decode received communications by, for example, determining a location of the boundary between the preamble and the header in each communication. The decoder 160 determines the location of the boundary based on one of the at least two polarity transitions. Accordingly, the remote device 140 can determine the location of the boundary when noise on the communication channel 130 corrupts a portion of the preamble.

The impulsive noise on the communication channel 130 is an effect of electrical equipment connected to the communication channel 130. For example, the communication channel is a household electric line, an industrial electric line, or another power line that is configured to carry and deliver power to electronic devices. Accordingly, in one embodiment, the communication channel 130 delivers alternating current (A/C) power to the communication device 100 and the remote device 140 in addition to carrying communications between the communication device 100 and the remote device 140. The A/C power can be 60 hertz (Hz), 50 Hz, or another frequency that is used to carry power.

The communication device 100 may use a same connection used to communicate or a separate connection to obtain power from the communication channel 130. The communications transmitted on the communication channel 130 are, for example, narrow-hand power-line communications (NB-PLC). The communications operate in a frequency range of 3 kHz to 500 kHz. In one embodiment, the communications are Comite Europeen de Normalisation Electrotechnique (CENELEC) band 3-148.5 kHz, Federal Communication Commission (FCC) band 9-490 kHz, Association of Radio Industries and Businesses (ARIB) 10-450 kHz, and so on.

Figure 2:
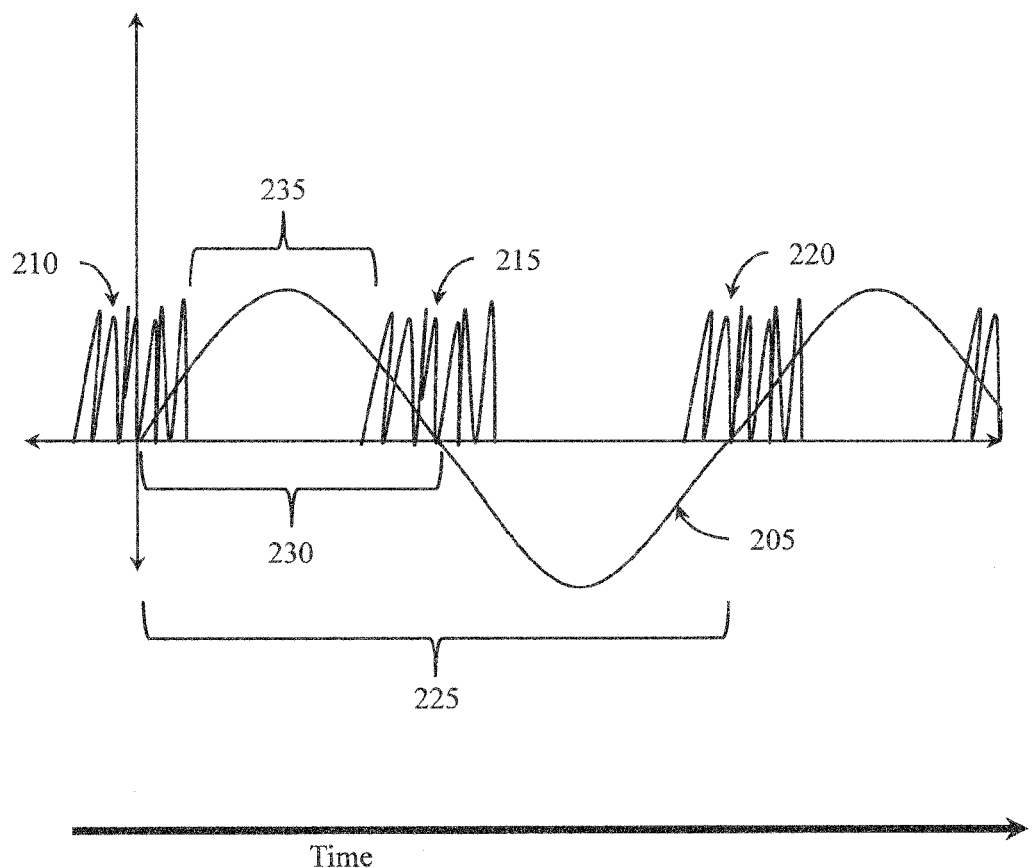
FIG. 2 illustrates one example of a segment of an A/C power signal that occurs on a power line channel.

FIG. 1 will now be discussed with reference to FIG. 2. FIG. 2 illustrates a segment of an A/C power signal 205 that occurs on the communication channel 130. Signals 210, 215, and 220 represent impulsive noise signals that occur periodically on the communication channel 130. In general, the impulsive noise signals occur at zero crossings of the A/C power signal 205. That is, the impulsive noise signals occur when the A/C power signal 205 has an amplitude of zero.

In some instances, the impulsive noise signals can have a combined duration of one-half of a period 225 of the A/C signal 205. Accordingly, for each half cycle 230 of the A/C power signal 205, a usable portion 235 is one-fourth of the whole period 225. Thus, the usable portion 235 of the duty cycle 225 is reduced by the presence of the impulsive noise signals. The usable portion 235 is a portion of time when information may be communicated on the communication channel 130 of FIG. 1 without being corrupted by the impulsive noise signals.

However, communications on the communication channel 130 occur simultaneously and without regard to when the impulsive noise signals (e.g., 210, 215, and 220) occur. At times, the impulsive noise can interfere with detecting a transition between, for example, a preamble and a header in a communication. The impulsive noise interferes with detecting the transition by corrupting portions of the preamble that include, for example, a polarity transition.

Accordingly, the transmission logic 120 is configured to control the transmitter 110 to generate at least two polarity transitions in the preamble of a communication. Additionally, the transmission logic 120 controls the transmitter 110 to generate the polarity transitions based on a predetermined length of the impulsive noise signals 210, 215, and 220. In one embodiment, the transmission logic 120 ensures that the polarity transitions are generated approximately one-fourth of the period 225 apart. In this way, spacing of the polarity transitions ensures that if one of the polarity transitions occurs at the same time as an impulsive noise signal, then another polarity transition will occur during the usable portion 235. Thus, the decoder logic 160 of the remote device 140 can still determine a boundary between the preamble and the header using a polarity transition that was not corrupted by the impulsive noise.

Figure 3:
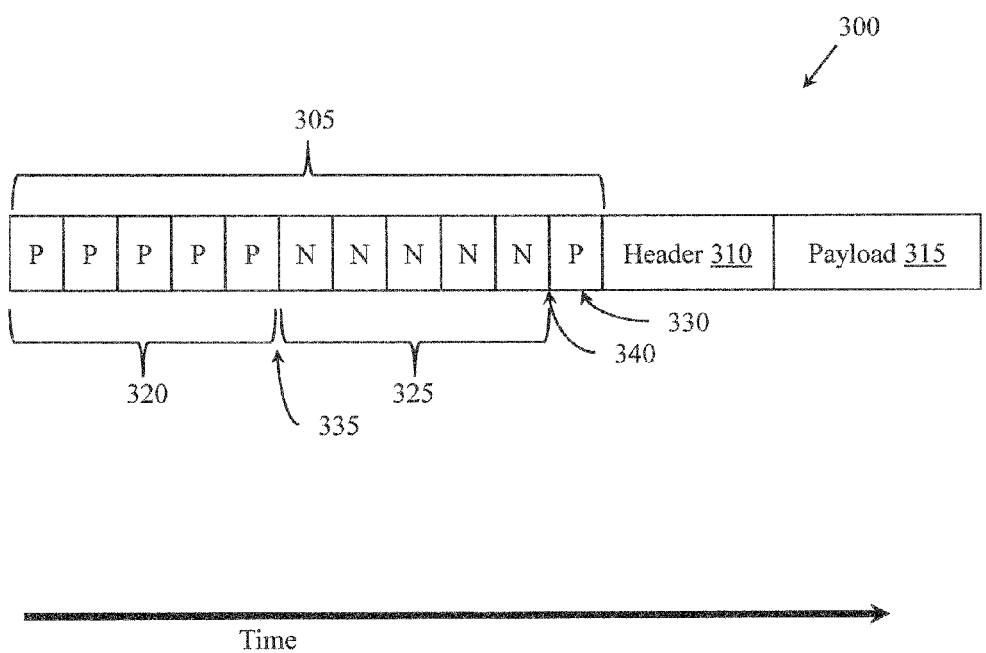
FIG. 3 illustrates one embodiment of a communication that includes a preamble with two polarity transitions.

FIG. 3 illustrates one embodiment of a communication 300 generated by the communication device 100 of FIG. 1. In one embodiment, the communication 300 is a data packet that includes a preamble 305, a header 310, and a payload 315. The preamble 305 includes a plurality of symbols, which are data symbols that may be predefined and known by both a communicating device (e.g., the communication device 100) and a receiving device (e.g., the remote device 140).

The preamble 305 includes a first sequence of symbols 320, a second sequence of symbols 325, and a final sequence of symbols 330. The transmission logic 120 controls the transmitter 110 to generate the second sequence of symbols 325 with a different polarity than the first sequence of symbols 320 and the final sequence of symbols 330. In this way, the preamble 305 includes a first polarity transition 335 and a second polarity transition 340. As used in this disclosure, a polarity transition refers to a change in polarity between two adjacent symbols. That is, a first symbol has a positive polarity and a second symbol has a negative polarity or vice versa.

A polarity of symbols in the first sequence 320 is indicated by a "P" for each positive (e.g., a positive amplitude) symbol and a polarity of symbols in the second sequence is indicated by an "N" for each negative (e.g., a negative amplitude) symbol. In one embodiment, the transmitter 110 uses a shift register to modulate each symbol (e.g., 320, 325, and 330) with a binary sequence of a particular polarity to generate the sequences with the specified polarities. In general, an order of positive to negative polarity or vice versa may occur, so long as a transition from one polarity to another polarity is present. Additionally, while two polarity transitions are illustrated in the preamble 305, the transmission logic 120 can control the transmitter 110 to generate more than two polarity transitions.

To prevent impulsive noise signals from corrupting both polarity transitions in the preamble 305, a length of the first sequence 320 and the second sequence 325 is determined based on, for example, characteristics of the communication channel 130, which can be obtained via observations, measurements, and/or tests. The characteristics of the communication channel 130 can include a frequency of the A/C power signal 205, a likely duration of the impulsive noise, a likely interval between two pieces of impulsive noise, and so on. Lengths of the first sequence 320 and the second sequence 325 are equal and are a value that avoids a possibility of the impulsive noise signals corrupting both polarity transitions 335 and 340. In one embodiment, the transmission logic 120 is configured to control the transmitter 110 to generate the sequences of symbols (320 and 325) with a length calculated using equation (1).

$$L_2 = \frac{ZC}{2} = \frac{T}{4} \qquad (1)$$

In equation (1), $L_2$ represents a length of the second sequence of symbols 325, which is also equal to the length $L_1$ of the first sequence of symbols 320. Consequently, a relationship between lengths of the sequences and polarities of the sequences can be represented by $L_2 = -L_1$. That is, $L_1$ has the same length has $L_2$ but with symbols of an opposite polarity. Additionally, ZC represents an amount of time between two zero crossings of an A/C power signal on the communication channel 130. For example, ZC correlates with the half cycle 230 of the A/C power signal 205 of FIG. 2. T is a period of the A/C power signal (e.g., 60 Hz or 50 Hz).

As an example of equation (1), consider an A/C power signal with a frequency of 60 Hz (e.g., T=1/60 s). A half cycle (e.g., half cycle 230) is one-half of the period or 8 ms, thus, ZC=8 ms=0.008 s. $L_2$ will be rounded to an integer multiple of a length of an individual symbol. This example provides a result of $L_2$=0.004. When the length of the individual symbol is 0.0005 s there will be 8 symbols in the second sequence of symbols (0.0005×8=0.004). Consequently, the first sequence of symbols will also include 8 symbols, but of a different polarity. In general, the final sequence of symbols (e.g., the sequence 330) includes a single symbol that has the same polarity as symbols in the first sequence of symbols. Of course, the final sequence could include more than one symbol in other embodiments.

An overall length $L_{preamble}$ of the preamble is provided by equation (2) for the current example.

$$L_{Preamble} = 2L_2 + L_{Symbol} \qquad (2)$$

In one embodiment, the overall length $L_{preamble}$ of the preamble is calculated in order to be at least one-half of a period of the A/C power signal. Thus, a length for each of the first sequence and second sequence is at least one-fourth a length of the period of the A/C power signal and the final sequence adds an additional length $L_{Symbol}$ of a single symbol.

Figure 4:
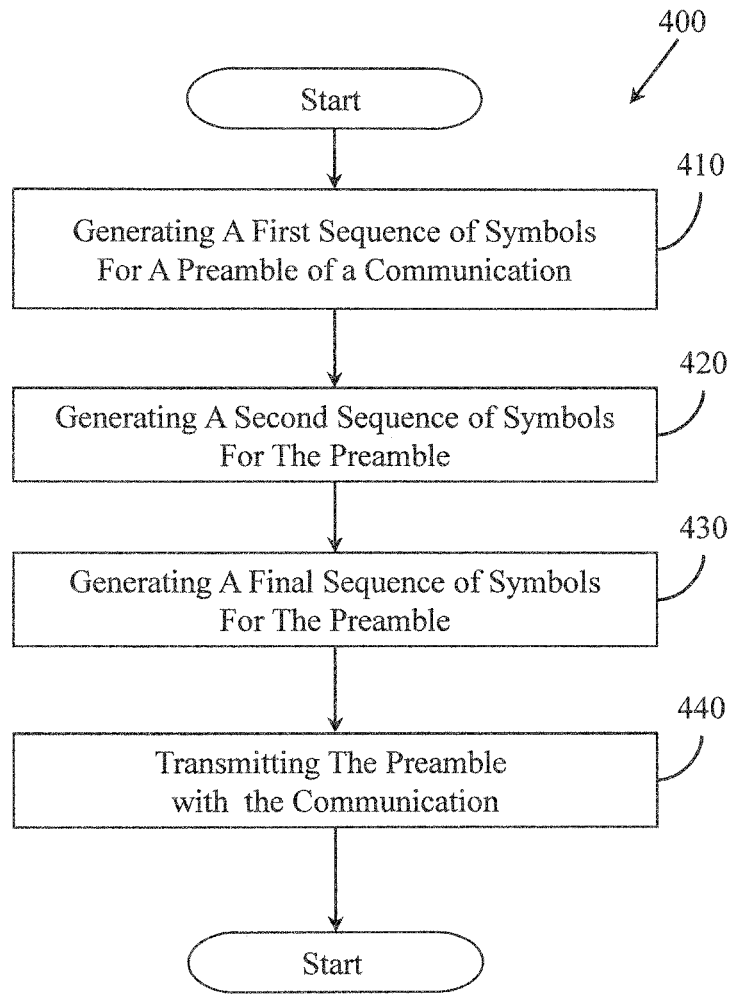
FIG. 4 illustrates one embodiment of a method associated with communicating over a power line channel.

Further details of using a preamble with at least two polarity transitions to communicate over a power line channel will be discussed with FIG. 4. FIG. 4 illustrates a method 400 associated with generating a preamble with multiple polarity transitions. FIG. 4 will be discussed from the perspective of the communication device 100 of FIG. 1.

At 410, the communication device 100 generates a first sequence of symbols for a preamble of a communication. The first sequence of symbols has a polarity $p_1$, a length $L_1$, and a number of symbols $N_1$. The number of symbols $N_1$ is determined based on the length $L_1$ The length $L_1$ is determined, for example, according to equation (1) above. Thus, to determine $N_1$, $L_1$ can be divided by a time duration for a single symbol. A resulting value can be rounded (up or down) to an integer value and used as the value $N_1$. In general, the length $L_1$ is about one-fourth of the period of the A/C power signal that is present on the communication channel 130. In this way, a distance between two polarity transitions is about one-fourth of the period of the A/C power signal.

The polarity $p_1$ is either positive or negative, but in either case is a different polarity than a polarity $p_2$ of a second sequence of symbols that are generated at 420. In this manner, a first transition in polarity in the preamble occurs between the first sequence and the second sequence. The first transition is used by a device (e.g., the remote device 140) receiving the communication to determine a boundary between the preamble and a header that is also part of the communication.

At 420, the communication device 100 generates the second sequence of symbols with the polarity $p_2$, a number of symbols $N_2$, and a length $L_2$. Because $L_2 = L_1$ and $N_2 = N_1$, $L_2$ can also be determined using equation (1). In either case, the length $L_2$ is about one-fourth of the period of the A/C power signal. As discussed previously, the polarity $p_2 = -p_1$.

At 430, the communication device 100 generates a final sequence of symbols. The final sequence of symbols has a length $L_{final}$, a number of symbols $N_{final}$, and a polarity $p_{final}$. In one embodiment, the final sequence of symbols is one symbol long (e.g., $N_{final}=1$). The polarity $p_{final}=p_1$. Accordingly, the first transition occurs between the first sequence of symbols and the second sequence of symbols and a second transition occurs between the second sequence of symbols and the final sequence of symbols. In this way, a length $L_{transitions}$ between polarity transitions is equal to $L_2$ ($L_{transitions}=L_2$) and is also, therefore, about one-fourth of the period of the A/C power signal.

The communication device 100 ensures that the impulsive noise will not corrupt both polarity transitions, by generating the sequences with lengths (e.g., $L_1$, $L_2$, $L_{final}$) and polarities (e.g., $p_1$, $p_2$, $p_{final}$) in this manner. That is, by ensuring, for example, L1 is one-fourth of the period of the A/C power signal, which is also a duration of an impulsive noise signal, the communication device 100 ensures that at least one of the polarity transitions will not be corrupted by the impulsive noise.

The communication device 100 generates the sequences of the symbols at 410, 420, and 430 by, for example, modulating predefined symbols known to both the communication device 100 and a receiving device (e.g., the remote device 140) with a pseudo-random binary sequence. The communication device 100 may modulate the sequences using a shift register. Additionally, the communication device 100 may modulate each sub-carrier of the communication in this way. The pseudorandom sequence may have either a positive or a negative polarity that is specific to a desired polarity for each sequence. In this way, the communication device 100 can generate each sequence with an appropriate polarity. In one embodiment, the first sequence of symbols, the second sequence of symbols, and the third sequence of symbols are sequences of orthogonal frequency-division multiplexing (OFDM) symbols.

At 440, the communication device 100 transmits the preamble to a remote device, as a first part of the communication. While generating the first, second, and final sequences are discussed as occurring sequentially and prior to transmitting the preamble, each sequence may be transmitted as it is generated and not after each sequence has already been generated.

Figure 5:
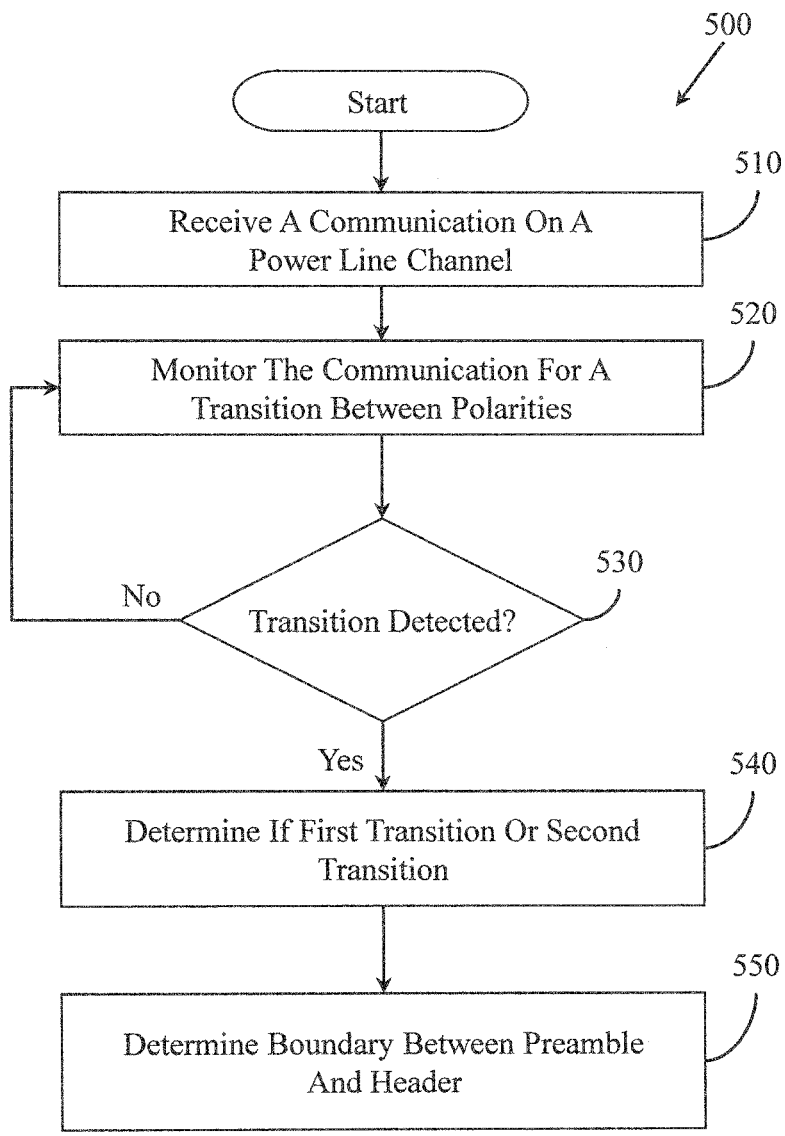
FIG. 5 illustrates another embodiment of a method associated with communicating over a power line channel.

Further details of communicating on a power line channel using a preamble with at least two polarity transitions will now be discussed with reference to FIG. 5. FIG. 5 illustrates a method 500 associated with receiving a communication with a preamble that includes at least two polarity transitions. FIG. 5 will be discussed from the perspective of the remote device 140 of FIG. 1.

At 510, the remote device 140 receives a communication on a power line channel (e.g., the communication channel 130). In general, receiving the communication at 510 occurs continuously since the communication is transmitted sequentially and also received sequentially. Accordingly, at least 520 and 530 occur as additional portions of the communication are being received.

At 520, the remote device 140 monitors the communication as it is received for a transition of polarities from one symbol in the preamble to a next symbol. For example, if a first sequence of symbols has a positive polarity the remote device 140 monitors the communication for a change to a symbol with a negative polarity to detect a second sequence of symbols. Additionally, the remote device 140 may also monitor for a transition from negative to positive that indicates the occurrence of the second transition point between the second sequence and the final sequence. In another embodiment, the remote device 140 includes a decoder configured to analyze the communication signal to identify multiple polarity transitions.

At 530, if a transition is detected the remote device 140 proceeds to 540 of method 500 and determines whether the transition is the first transition or the second transition. For example, at 540, the remote device knows whether a transition from negative to positive is a first or second transition based on a predetermined configuration. Accordingly, using the predetermined configuration, the remote device 140 knows whether a transition point is a first or second transition since each transition is unique. That is, the preamble will include a positive to negative transition and a negative to positive transition. Each of the transitions correlate with the predetermined configuration, which is, for example, the first transition is positive to negative and the second transition is negative to positive.

Upon determining if the transition is the first or second transition, the remote device 140 proceeds to 550 where the boundary between the preamble and the header is determined. In one embodiment, the remote device 140 calculates the boundary based on whether the transition is the first or second and on a predetermined configuration of the preamble. For example and with reference to FIG. 3, if the remote device 140 detects a positive to negative transition, then the transition is the first transition 335. The remote device 140 knows that from the first transition to the boundary between the preamble 305 and the header 310 that there are six symbols. Accordingly, using timing associated with each symbol the remote device can determine the boundary from the first transition 335 and in a similar manner for the second transition 340.

Figure 6:
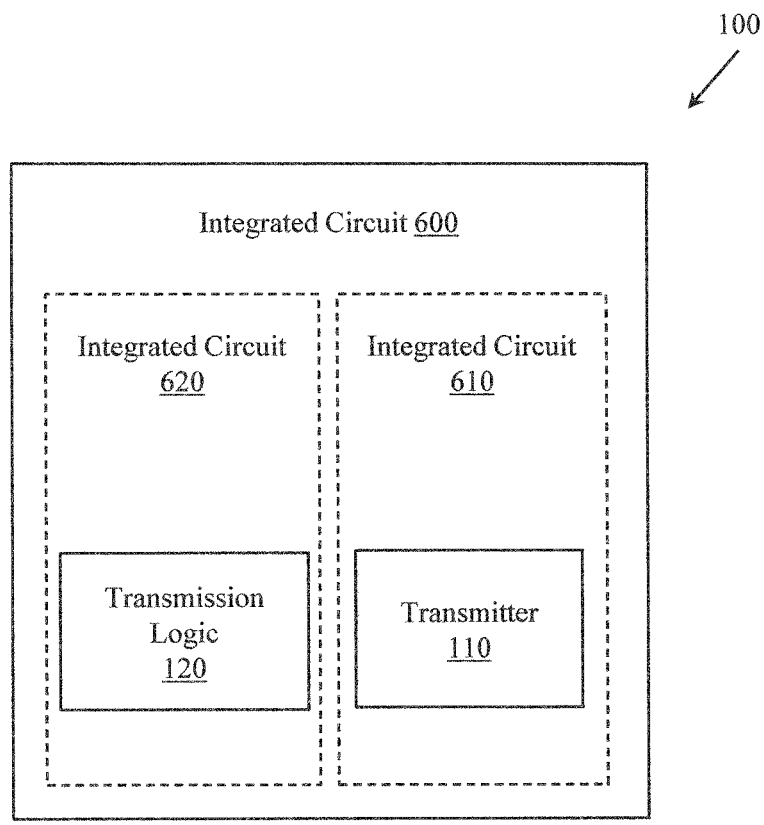
FIG. 6 illustrates one embodiment of an integrated circuit associated with communicating over a power line channel.

FIG. 6 illustrates an additional embodiment of the communication device 100 from FIG. 1 that is configured with separate integrated circuits and/or chips. In this embodiment, the transmitter 110 from FIG. 1 is embodied as a separate integrated circuit 610. Additionally, the transmission logic 120 is embodied on an individual integrated circuit 620. The circuits are connected via connection paths to communicate signals. While integrated circuits 610 and 620 are illustrated as separate integrated circuits, they may be integrated into a common circuit board 600.

Figure 7:
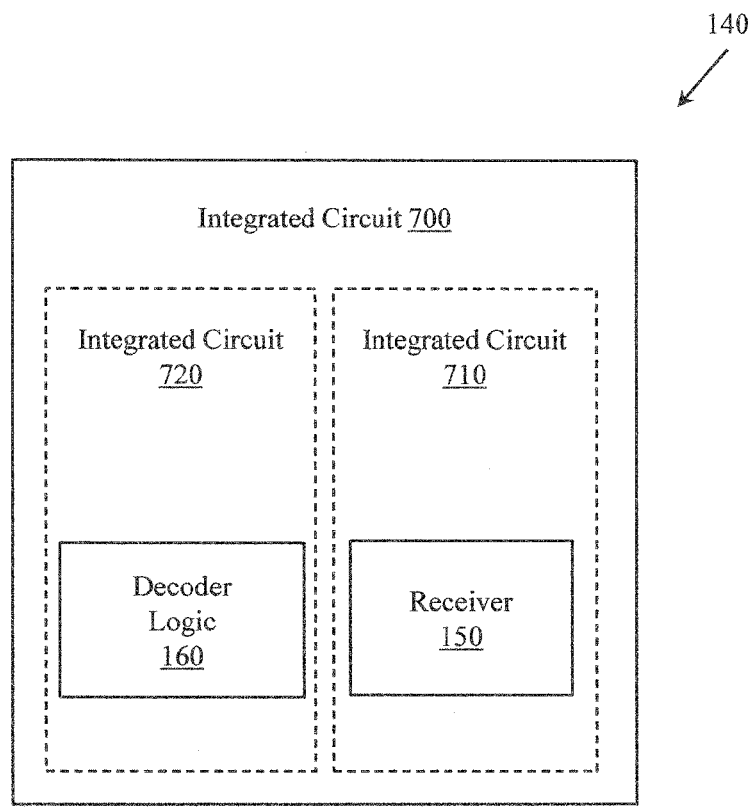
FIG. 7 illustrates another embodiment of an integrated circuit associated with communicating over a power line channel.

FIG. 7 illustrates another embodiment of the remote device 140 from FIG. 1 that is configured with separate integrated circuits and/or chips. In this embodiment, the receiver 150 from FIG. 1 is embodied as a separate integrated circuit 710. Additionally, the transmission logic 160 is embodied on an individual integrated circuit 720. The circuits are connected via connection paths to communicate signals. While integrated circuits 710 and 720 are illustrated as separate integrated circuits, they may be integrated into a common circuit board 700.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this disclosure is intended to embrace alterations, modifications, and variations that fall within the scope of the appended claims.

What is claimed is:

1. An apparatus, comprising:
a transmitter configured to transmit a communication signal on a communication channel for communicating with a remote device, wherein the communication channel is a power line channel that carries electric power transmissions; and
a transmission logic configured to control the transmitter to generate at least two polarity transitions in a preamble of the communication signal,
wherein the transmission logic is configured to control the transmitter to generate the at least two polarity transitions in the preamble by generating the preamble using a first sequence of symbols, a second sequence of symbols that occur after the first sequence of symbols, and a final sequence of symbols that occur after the second sequence of symbols, wherein symbols in the second sequence of symbols have a different polarity than symbols of i) the first sequence of symbols and ii) the final sequence of symbols.

2. The apparatus of claim 1, wherein the transmission logic is configured to control the transmitter to generate the at least two polarity transitions by generating at least two sequences of symbols with different polarities, wherein the transmission logic is configured to control the transmitter to generate the at least two transitions in the preamble to identify a boundary between the preamble and a header of the communication signal.

3. The apparatus of claim 1, wherein the communication signal is a narrow-band power-line communication.

4. The apparatus of claim 1, wherein symbols in the preamble are predefined.

5. The apparatus of claim 1, wherein the transmission logic is configured to control the transmitter to:
generate a header and a payload, wherein the header and the payload both occur after the preamble; and
generate symbols of the preamble by modulating each sub-carrier of the communication signal with a pseudo-random binary sequence using a shift register.

6. The apparatus of claim 1, wherein the transmission logic is configured to control the transmitter to generate the preamble to prevent effects from noise on the communication channel that occurs at a known period.

7. An apparatus, comprising:
a transmitter configured to transmit a communication signal on a communication channel for communicating with a remote device, wherein the communication channel is a power line channel that carries electric power transmissions; and
a transmission logic configured to control the transmitter to generate at least two polarity transitions in a preamble of the communication signal,
wherein the transmission logic is configured to control the transmitter to generate the at least two polarity transitions by generating a first sequence of symbols and a second sequence of symbols, wherein each of the first sequence of symbols and the second sequence of symbols have a length that is at least one-fourth of a duration of a period of the electric power transmissions, and wherein the electric power transmission is a sinusoidal wave.

8. A method, comprising:
controlling a transmitter to generate at least two polarity transitions in a preamble of a communication signal; and
transmitting, by the transmitter, the communication signal on a communication channel for communicating with a remote device, wherein the communication channel is a power line channel that carries electric power transmissions,
wherein controlling the transmitter to generate the at least two polarity transitions in the preamble includes generating the preamble using a first sequence of symbols, a second sequence of symbols that occur after the first sequence of symbols, and a final sequence of symbols that occur after the second sequence of symbols, wherein symbols in the second sequence of symbols have a different polarity than symbols of the first sequence of symbols and the final sequence of symbols.

9. The method of claim 8, wherein controlling the transmitter to generate the at least two polarity transitions includes generating at least two sequences of symbols with different polarities in the preamble.

10. The method of claim 8, wherein controlling the transmitter to generate the at least two polarity transitions includes generating the first sequence of symbols and the second sequence of symbols, wherein each of the first sequence of symbols and the second sequence of symbols have a length that is at least one-fourth of a period of the electric power transmissions.

11. The method of claim 8, wherein controlling the transmitter to generate the preamble with the at least two polarity transitions includes generating the preamble to permit a remote device receiving the communication signal to detect a boundary between the preamble and a header of the communication signal.

12. The method of claim 8, wherein symbols in the preamble are predefined symbols that are known by the remote device and the apparatus.

13. The method of claim 8, wherein controlling the transmitter to generate the preamble includes generating symbols of the preamble by modulating each sub-carrier of the communication signal with a pseudo-random binary sequence using a shift register, and wherein the communication signal includes a header and a payload that occur after the preamble.

14. An apparatus, comprising:
a receiver configured to receive a communication from a communication channel that is a power line channel; and
a decoder logic configured to determine a boundary in the communication between a preamble and a header of the communication, wherein the decoder logic is configured to determine the boundary based, at least in part, on one of at least two polarity transitions in the preamble of the communication,
wherein the preamble includes a first and second sequence of symbols each with a length that is at least one-fourth of a period of electric power transmissions on the power line channel, and wherein the first and the second sequence of symbols have opposite polarities.

15. The apparatus of claim 14, wherein the decoder logic is configured to determine the boundary by identifying one of the at least two polarity transitions in the preamble of the communication.

16. The apparatus of claim 15, wherein the decoder logic is configured to determine the boundary by using the first polarity transition or the second polarity transition to calculate a position of the boundary.

17. The apparatus of claim 14, wherein the decoder logic is configured to detect a first polarity transition of the at least two polarity transitions in the preamble and to calculate the boundary based on the first polarity transition.

* * * * *